United States Patent
Jablonowski et al.

(10) Patent No.: US 7,164,833 B2
(45) Date of Patent: Jan. 16, 2007

(54) OPTICAL FIBER FOR IMPROVED PERFORMANCE IN S-, C- AND L-BANDS

(75) Inventors: Donald Jablonowski, Dunwoody, GA (US); David Kalish, Roswell, GA (US); Jinkee Kim, Norcross, GA (US); Robert Lingle, Jr., Norcross, GA (US)

(73) Assignee: Fitel U.S.A. Corp., Norcross, GA (US)

( * ) Notice: Subject to any disclaimer, the term of this patent is extended or adjusted under 35 U.S.C. 154(b) by 269 days.

(21) Appl. No.: 10/670,013

(22) Filed: Sep. 24, 2003

(65) Prior Publication Data

US 2005/0063656 A1    Mar. 24, 2005

(51) Int. Cl.
*G02B 6/02* (2006.01)
*H01S 3/30* (2006.01)

(52) U.S. Cl. .......................... 385/127; 372/6
(58) Field of Classification Search ............... None
See application file for complete search history.

(56) References Cited

U.S. PATENT DOCUMENTS 5,905,838 A * 5/1999 Judy et al. ............... 385/123
6,131,415 A 10/2000 Chang et al.
2003/0174988 A1 * 9/2003 Bickham et al. ............ 385/127

OTHER PUBLICATIONS

M. Gorlier, P. Sillard, F. Beaumont, L-A. de Montmorillon, L. Fleury, Ph. Guenot, A. Bertaina, and P. Nouch I, Alcatel Cable, OFC 2002.

* cited by examiner

*Primary Examiner*—Sung Pak

(57) ABSTRACT

An improved optical fiber design has been found to exhibit a relatively low attenuation at the wavelength of 1385 nm (the "water peak"), allowing for Raman amplification to be efficient and effective at wavelengths in the S-band range of 1460 to 1530 nm. An ultra-dry process is used to mate an inner core rod (core plus surrounding trench) with a cladding tube (ring region plus cladding layers) and provide a water peak loss on the order of 0.325 dB/km. The low water peak is combined with appropriate dispersion values and zero dispersion wavelength to form a fiber that supports transmission and Raman amplification in the S-, C- and L-bands of interest for optical transmission systems.

8 Claims, 9 Drawing Sheets

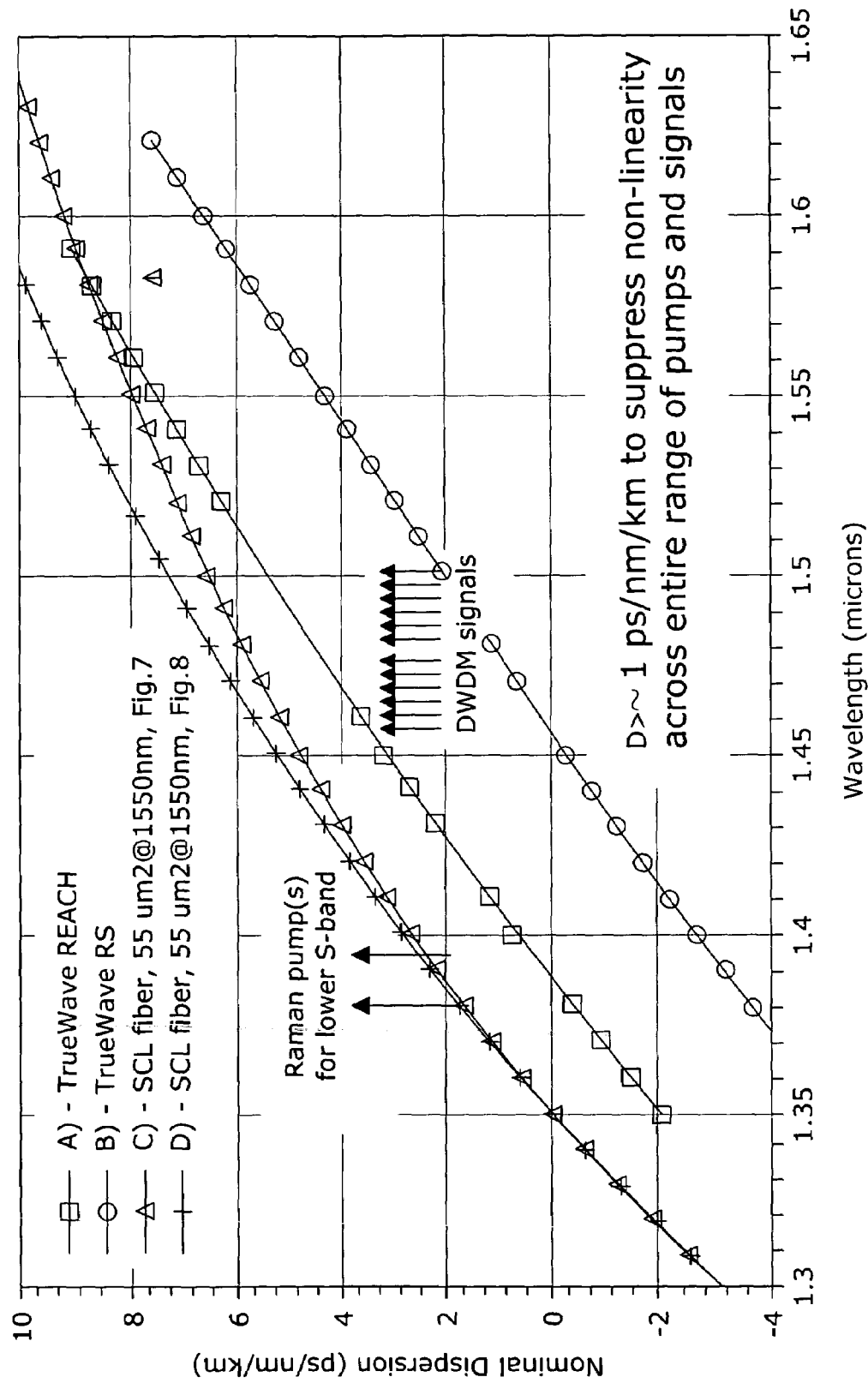

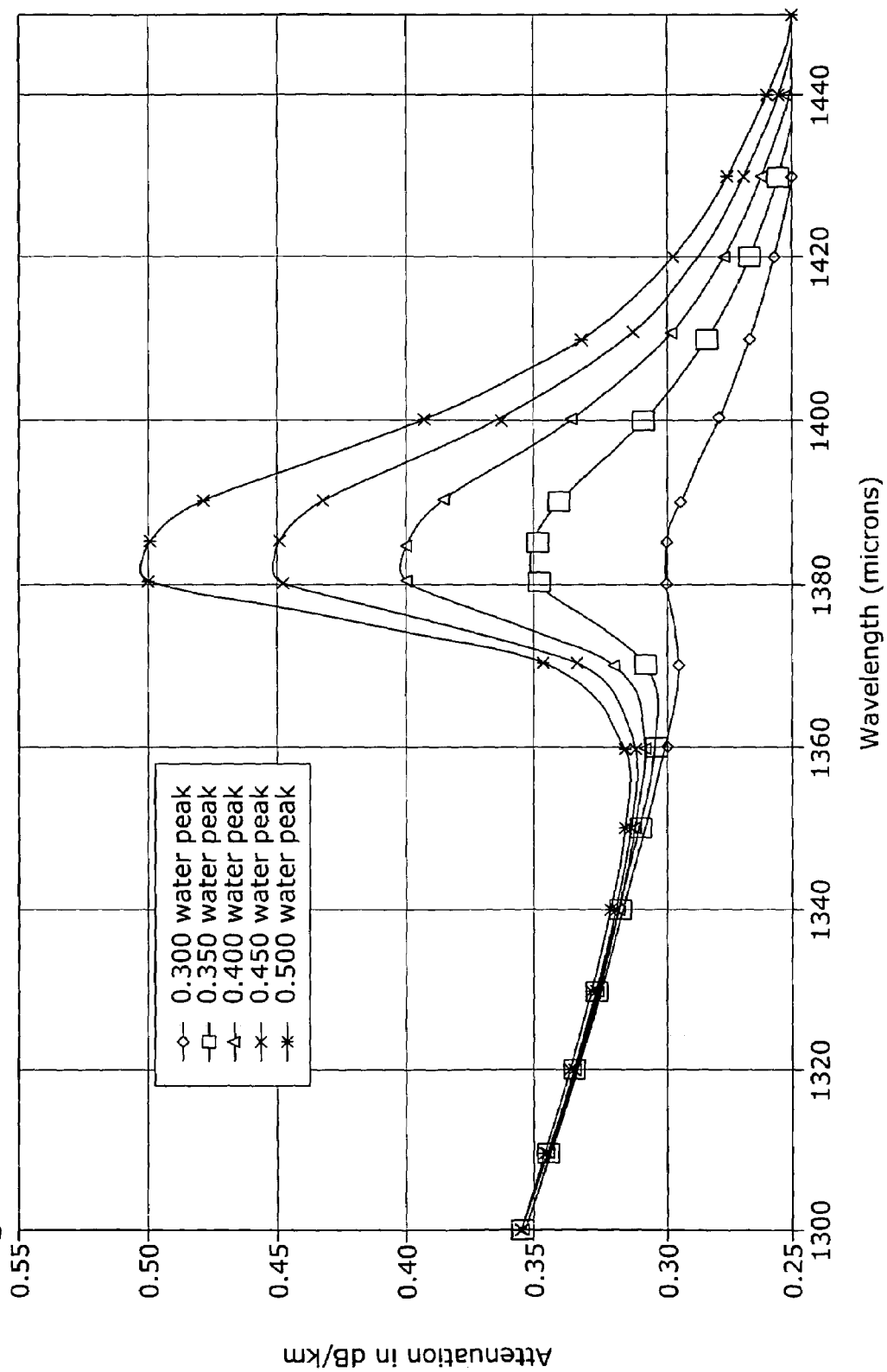
Fig. 3: Range of Water Peaks, 0.341 1310nm Loss Background

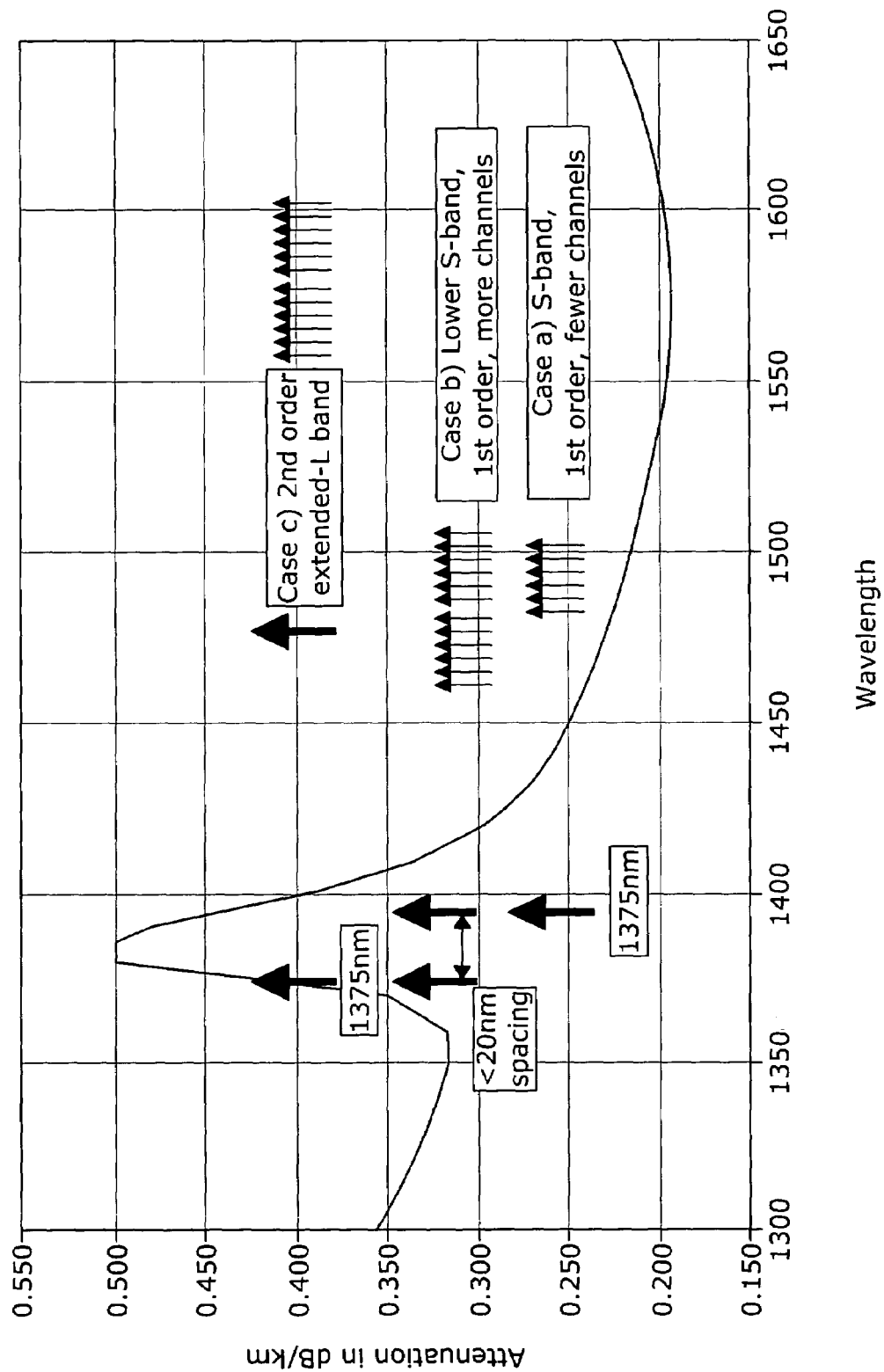
Fig. 4: Spectral Loss Curve with Raman Pumps and Signals

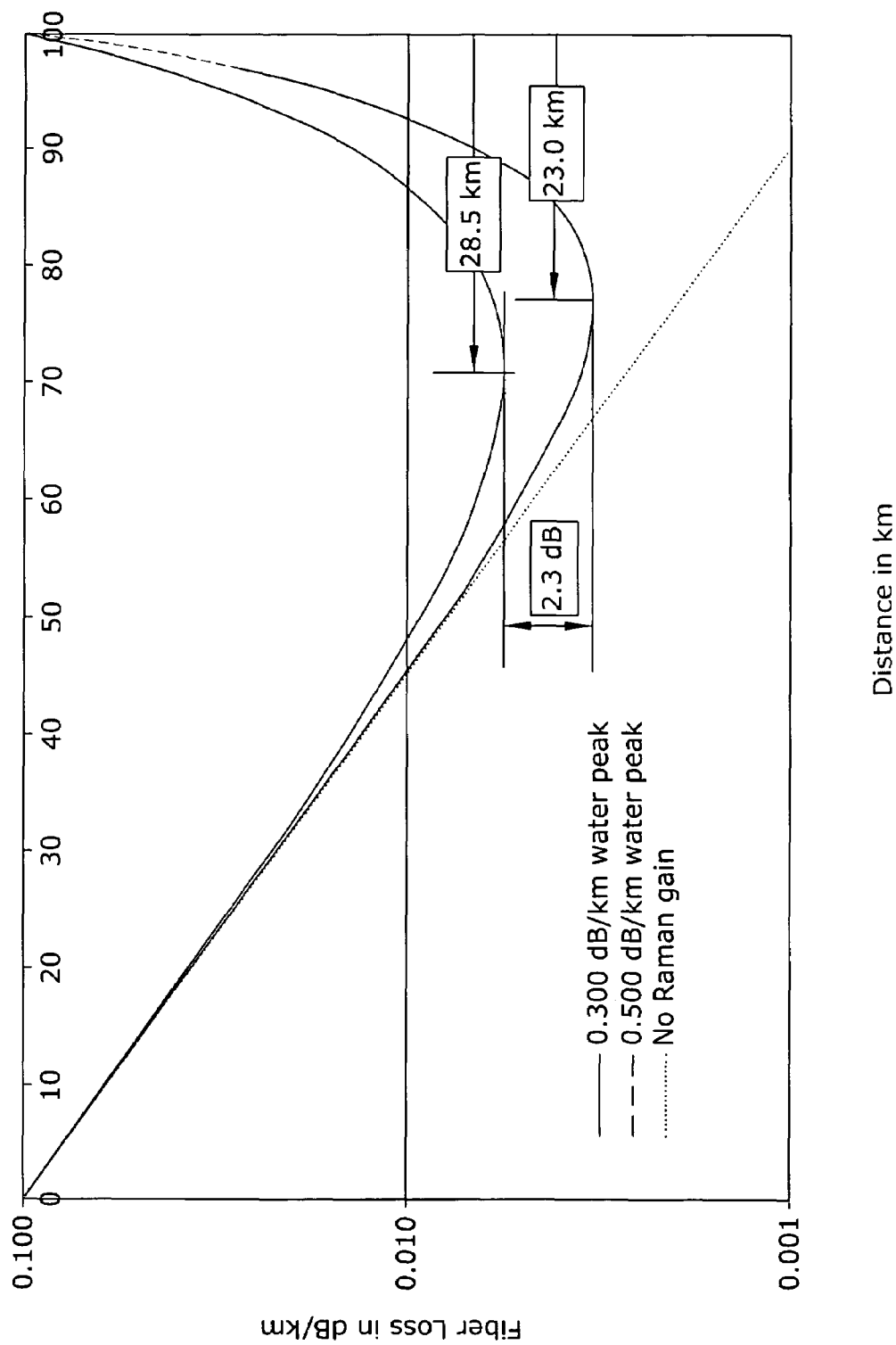

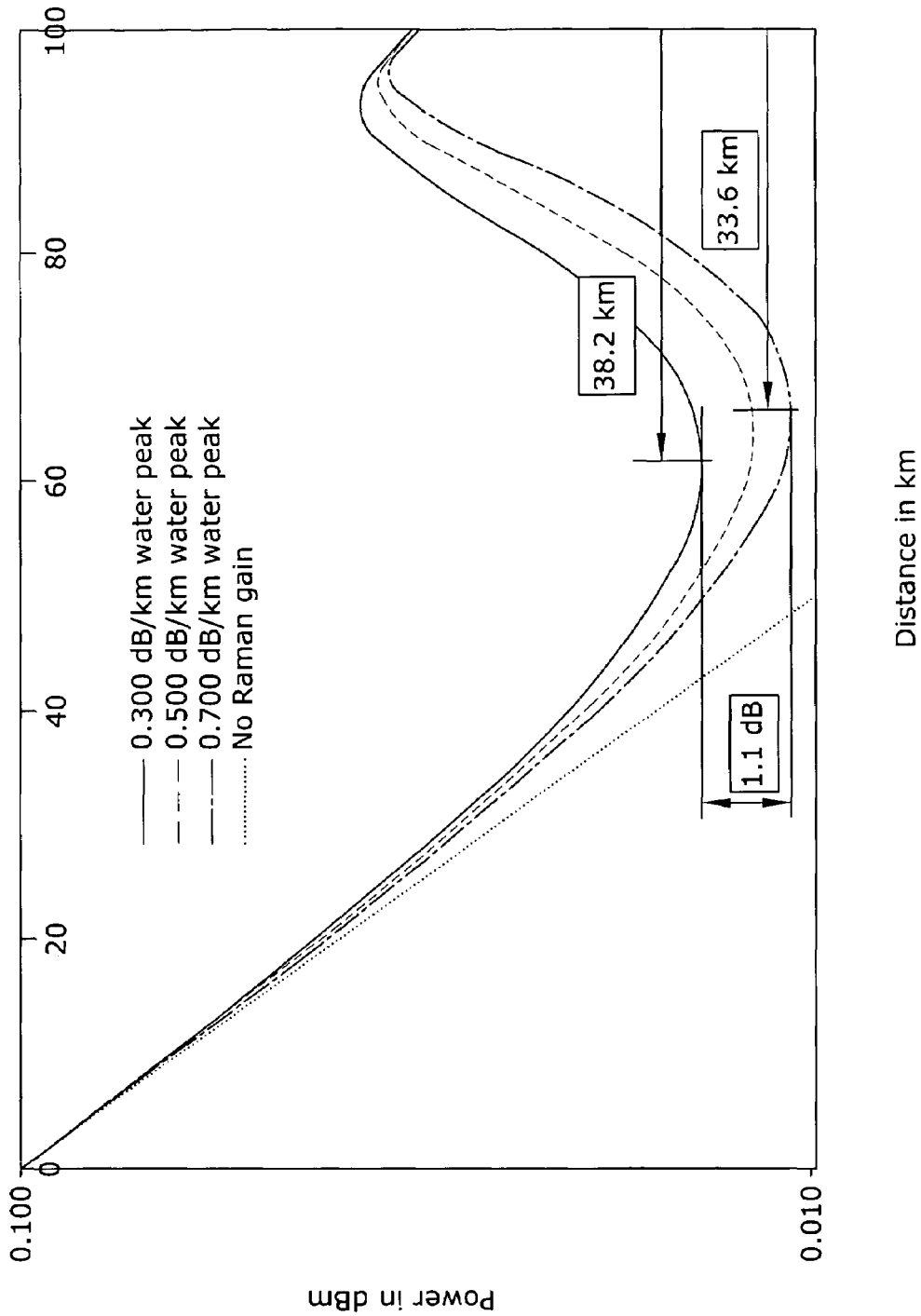

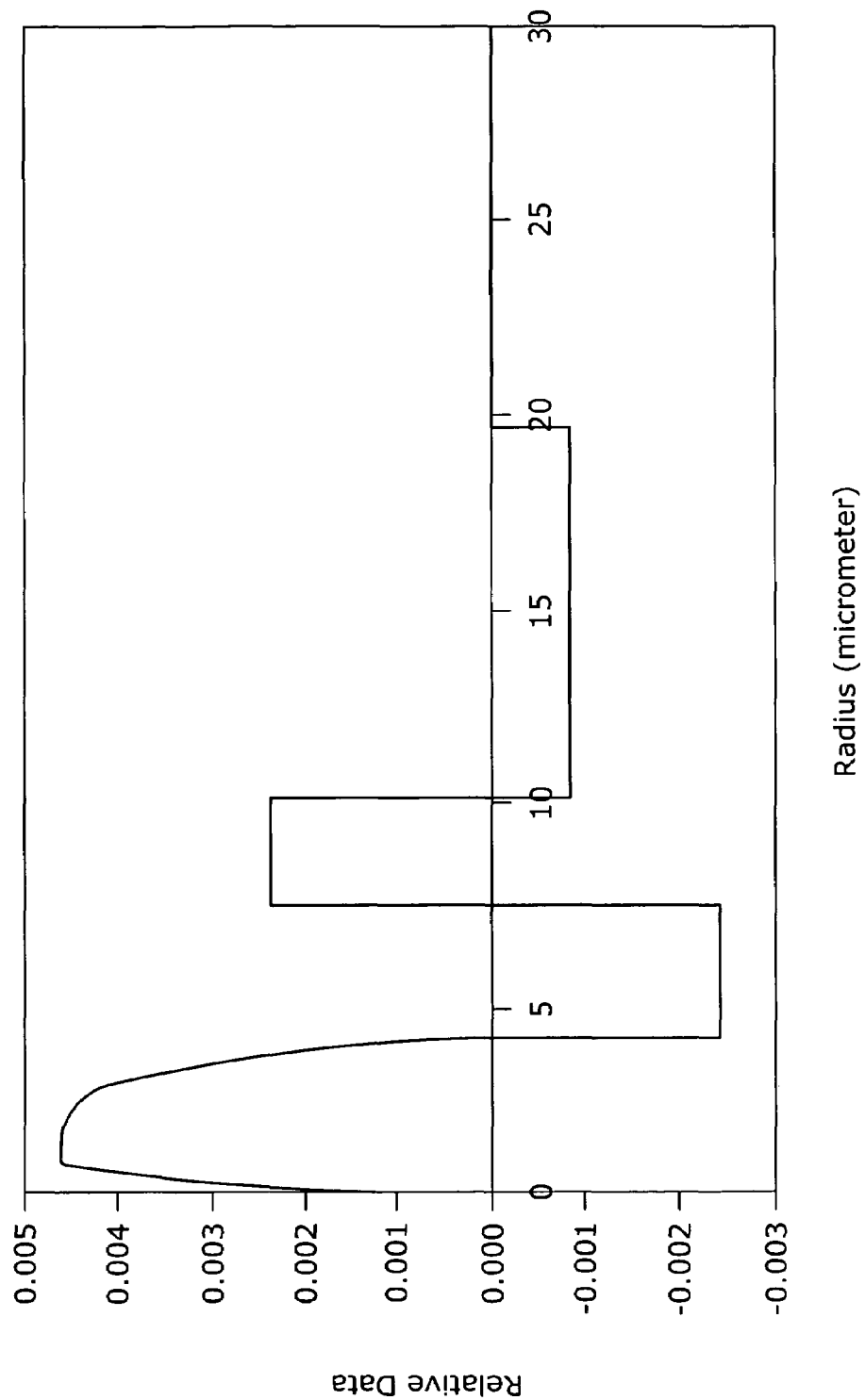

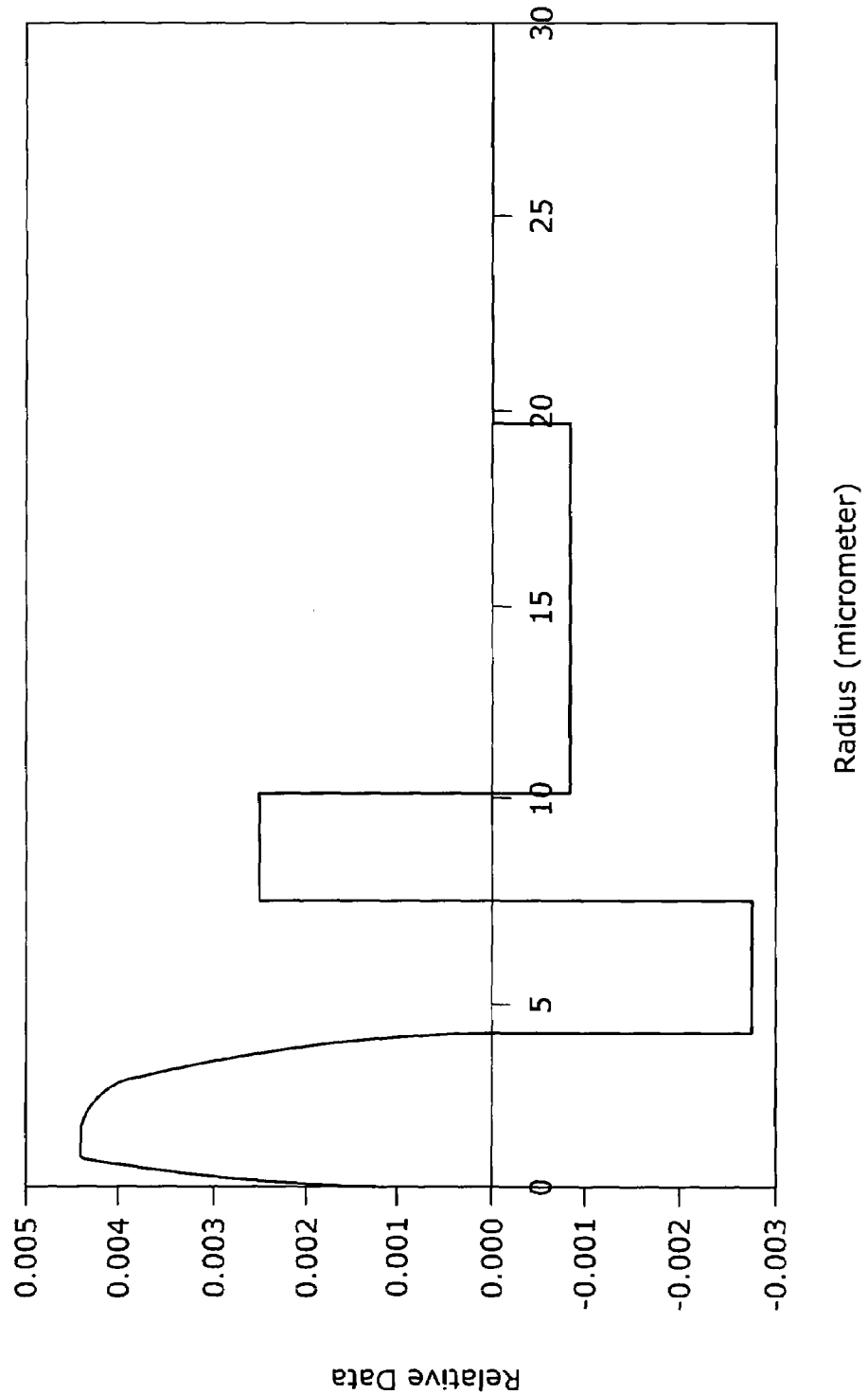

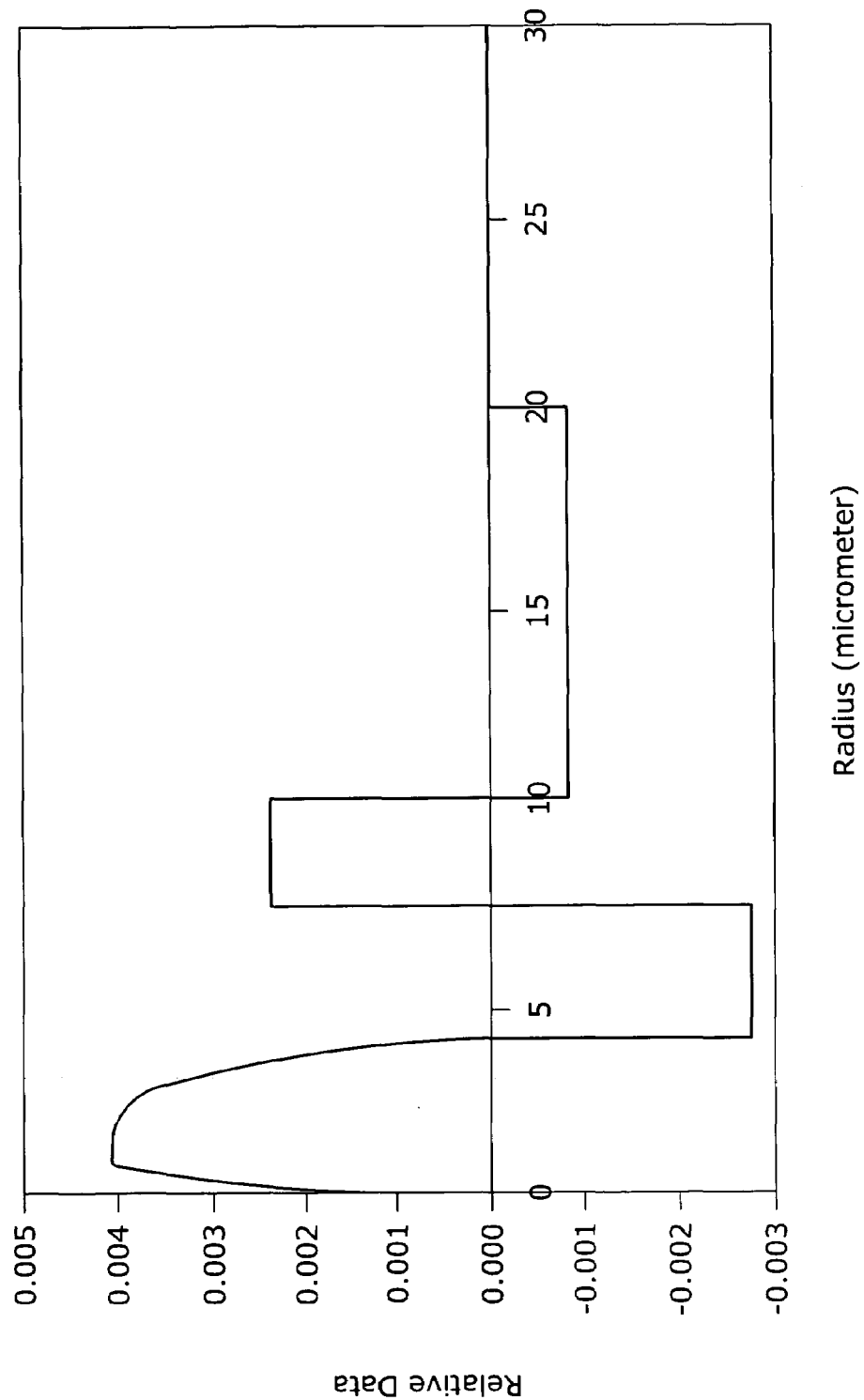
Fig. 9: Profile Representing a Third SCL Band Fiber

OPTICAL FIBER FOR IMPROVED PERFORMANCE IN S-, C- AND L-BANDS

TECHNICAL FIELD

The present invention relates to optical transmission fiber suitable to support distributed Raman amplification and, more particularly, to optical fiber exhibiting operating parameters compatible with generating Raman amplification in the S-band transmission region.

BACKGROUND OF THE INVENTION

As a result of the tremendous and continuous increase in data-intensive applications, the demand for bandwidth in communication systems has been ever-increasing. In response, the installed capacity of telecommunications operations has been largely supplanted by optical fibers that provide a significant bandwidth enhancement over the traditional copper wire-based systems.

To exploit the bandwidth of optical fibers, two key technologies have been developed and used in the telecommunications industry: optical amplifiers and wavelength division multiplexers (WDMs). Optical amplifiers boost the signal strength and compensate for inherent fiber loss and other splitting and insertion losses. WDMs enable different wavelengths of light to carry different signals in parallel over the same fiber. In most WDM systems there is a trade-off between the number of channels the system accommodates and the separation between adjacent channels. Higher bit rates generally call for an increase in channel spacing. Both goals favor a wide operating spectrum, that is, a wide range in operating wavelengths.

Moreover, it is important to have uniform gain over the entire operating spectrum of WDM optical communication systems. This objective becomes more difficult to reach as the operating wavelength is extended to shorter wavelengths (S-band systems, wavelengths from 1460–1530 nm), where conventional amplification techniques based on erbium-doped fiber amplifiers are unavailable. New types of optical fiber amplifiers have been developed that operate using stimulated Raman scattering. The most prominent of these is a distributed amplifier that operates over the normal transmission span as a traveling wave amplifier. Raman scattering is a process by which light incident on a medium is converted to light at a lower frequency (Stokes case) than the incident light. An optical pump source is used, where the pump photons excite the molecular vibrations of the optical medium up to a virtual level (non-resonant state). The molecular state quickly decays to a lower energy level, emitting a signal photon in the process Since the pump photon is excited to a virtual level, Raman gain can occur for a pump source at any wavelength, including the S-band (as defined above) and L-band (wavelengths approximately 1565–1625 nm). The difference in energy between the pump and signal photons is dissipated by the molecular vibrations of the host material. These vibrational levels determine the frequency shift and shape of the Raman gain curve. The frequency (or wavelength) difference between the pump and the signal photon is thus defined as the Stokes shift. The maximum Raman gain occurs at a Stokes shift of 13.4 THz (i.e., $13.4 \times 10^{12}$ Hz), which is approximately 100 nm from Raman pumps in the optical communications window.

Since Raman scattering can occur at any wavelength, this phenomenon can be exploited to advantage in a telecommunication system that contains multiple signal wavelengths by using Raman pump sources at several different wavelengths to amplify the information signals. The gain seen by a given information signal wavelength is therefore the superposition of the gain elements provided by all of the pumps, taking into account the transfer of energy between the pumps themselves due to Raman scattering. By properly weighting the power provided at each of the Raman pump wavelengths, it is possible to obtain a signal gain versus wavelength profile in which there is a small difference between the gain seen by different information signal wavelengths (where this difference is termed "gain ripple" or "gain flatness"). The use of Raman amplification with multiple pumps thus enables dense WDM technology to be responsible for the evolution from 10 to 40 Gb/s transmission, since it improves the optical signal-to-noise ratio (OSNR) at lower launch powers.

One persistent problem with the use of multiple pumps is the unwanted nonlinear effect referred to as four-wave mixing (FWM). In general, if two intense waves (e.g., a Raman pump and an information signal, or two Raman pumps) undergo four-wave mixing, they will generate two new frequency components such that all four waves will be equally spaced in frequency. It has been found that the strength of this unwanted effect can be significantly reduced by increasing the fiber dispersion at the mixing wavelengths (see, for example, U.S. Pat. No. 5,327,516 issued to A. R. Chraplyvy et al. describing the use of non-zero dispersion to suppress FWM between multiple signals). By adjusting the location of the zero dispersion wavelength (hence, the waveguide dispersion) of the fiber, FWM can be controlled and, in many cases, essentially eliminated. In general, it is desirable to have the "zero" of dispersion at a wavelength shorter than the shortest wavelength pump, so that the dispersion is greater than approximately 1 ps/km-nm over the entire region of Raman pumps and information signals. The precise dispersion value required depends on the fiber effective area and signal channel spacing, as well as other system design details.

The inefficiency problems associated with Raman amplification have been found to be particularly severe for S-band Raman amplification, where one or more pumps needs to be very close to, or even on top of, the 1385 nm "water peak" to make use of the full S-band (since the Raman pump is generally 100 nm lower than the information signal wavelength). The well-known water peak at 1385 nm is defined as the optical loss at this wavelength as a function of the water remaining in the glass. The more water that is present, the higher the loss. Accordingly, hydroxyl-ion absorption is frequently referred to as "water" absorption, and arises from lightwave energy being absorbed by the OH ion at wavelengths that are related to its different vibration modes. For example, the two fundamental vibrations of this ion occur at 2730 and 6250 nm, corresponding to its stretching and bending motions, respectively. Nevertheless, overtones and combination vibrations strongly influence the loss in the near infrared and visible wavelength regions. In particular, as mentioned above, the overtone at 1385 nm resides in the heart of region required for S-band Raman amplification. Indeed, concentrations of OH in the fiber core as low as one part per million (ppm) have been found to causes losses as high as 65 dB/km at 1385 nm. It is desirable to reduce this OH concentration to a level such that the overall optical loss at 1385 nm is at least comparable to the overall optical loss at, for example, 1310 nm (approximately 0.325 dB/km for matched clad fiber). It is currently commercially feasible to maintain the OH concentration at substantially less than one part per billion (ppb), particularly if VAD processing is used to make the core. However, the more complex the index profile becomes beyond simple matched clad designs, the more difficult it becomes to keep the OH concentration consistently below the sub-ppb level.

As mentioned above, Raman pumps are placed approximately 100 nm below (to the "blue" side of) the signal wavelength. As a result, operation in the lower two-thirds of the S-band suffers greatly from the presence of the water peak attenuation centered at 1385 nm. In particular, the Raman gain in the S-band (using one first-order pump) can be expressed as:

$$G = \exp(C_R * P_{pump} * L_{eff}), \text{ where}$$

$$L_{eff} = [1 - \exp(-\alpha_{pump} * L_{span})]/\alpha_{pump},$$

$C_R$ is defined as the Raman gain coefficient and $\alpha_{pump}$ is the loss at the pump wavelength. It is possible to compensate for fiber loss simply by raising the Raman pump power, if the goal is only to match the span Raman gain. This, however, may increase the cost of Raman pumping, as well as increase the heat dissipation load. Furthermore, if two spans with differing fiber loss are pumped to equal Raman gain, the span with higher loss will suffer more degradation of optical signal to noise ratio (OSNR) than the span with lower loss. Thus, higher fiber loss will either impair transmission performance or add system cost. In addition, variability in pump region loss is a severe problem for system engineers, since it is not known a priori what the loss (and thus the Raman gain) will be for a deployed fiber span.

Since it will be desirable, in future systems, to use Raman amplification in the S-band of optical signal transmission, it is necessary to develop a set of fiber parameters that overcome the problems of FWM and water peak attenuation in the short wavelength S-band regime.

SUMMARY OF THE INVENTION

The need remaining in the prior art is addressed by the present invention, which relates to optical transmission fiber suitable to support distributed Raman amplification and, more particularly, to optical fiber exhibiting operating parameters compatible with generating Raman amplification in the S-band transmission region.

In particular, an optical fiber of the present invention is defined by the following characteristics:

water peak loss (WPL) at 1385 nm less than 0.4 dB/km in all cases, and in particular maintained less than or equal to 0.325 dB/km by fabricating the core region using VAD or OVD processes;

zero dispersion wavelength (ZDW) less than or equal to 1355 nm (only one ZDW across entire transmission band from 1310 to 1625 nm); and chromatic dispersion (D) greater than 1 ps/nm-km at 1375 nm and less than 10 ps/nm-km at 1565 nm.

This set of characteristics represents fibers designed for distributed Raman amplification in the S-band, while also providing amplification in the traditional C-band and the longer wavelength L-band. Thus, a fiber formed in accordance with the present invention may be termed an "SCL band" fiber.

A variety of optical fiber refractive index profiles and processing techniques may be used to produce the above-defined transmission characteristics. The low water peak loss requirement is fulfilled in one embodiment of the present invention by making the inner core region using a vapor-assisted deposition (VAD) process. The outer core region is made using a modified chemical vapor deposition (MCVD) process, formed as an overcladded tube. The two regions are then mated in a chlorine atmosphere (or other suitable atmosphere) to form an ultra-dry interface, resulting in a water peak loss of approximately 0.31 dB/km using the VAD process. This composite core rod is then overclad with one or more synthetic silica tubes, taking care to prepare and maintain very dry interfaces.

Other and further aspects of the present invention will become apparent during the course of the following discussion and by reference to the accompanying drawings.

BRIEF DESCRIPTION OF THE DRAWINGS

Referring now to the drawings,

FIG. 2 is a graph depicting the three useable transmission bands (S-, C- and L-), illustrating the nominal dispersion (ps/nm-km) as a function of wavelength;

FIG. 3 shows fiber loss curves for an NZDF fiber with varying degrees of water peak at 1385 nm, superimposing the location of Raman pumps for first-order pumping in the S-band, as well as second-order pumping in the extended L-band;

FIG. 4 illustrates first- and second-order Raman pumping configurations in which a Raman pump must be placed in immediate proximity to the water peak;

FIG. 5 displays results of a calculation of the signal power in a Raman amplified, S-band single channel system, where the Raman pump is placed at 1395 nm to support operation in the vicinity of 1495 nm;

FIG. 6 depicts the signal power evolution in the case of second-order Raman pumping for signal transmission in the L-band near 1580 nm;

FIG. 7 illustrates the profile of a first optical fiber formed to exhibit the characteristics of the present invention, the dispersion curve for this fiber shown as curve C in FIG. 2;

FIG. 8 illustrates the profile of a second optical fiber, also suitable to support Raman amplification in the S-band transmission region, the dispersion curve for this fiber shown as curve D in FIG. 2;

FIG. 9 illustrates the profile of a third optical fiber according to the present invention, the third fiber having a dispersion curve essentially identical to that of the profile associated with FIG. 7, but with a larger effective area.

DETAILED DESCRIPTION

Figure 1:
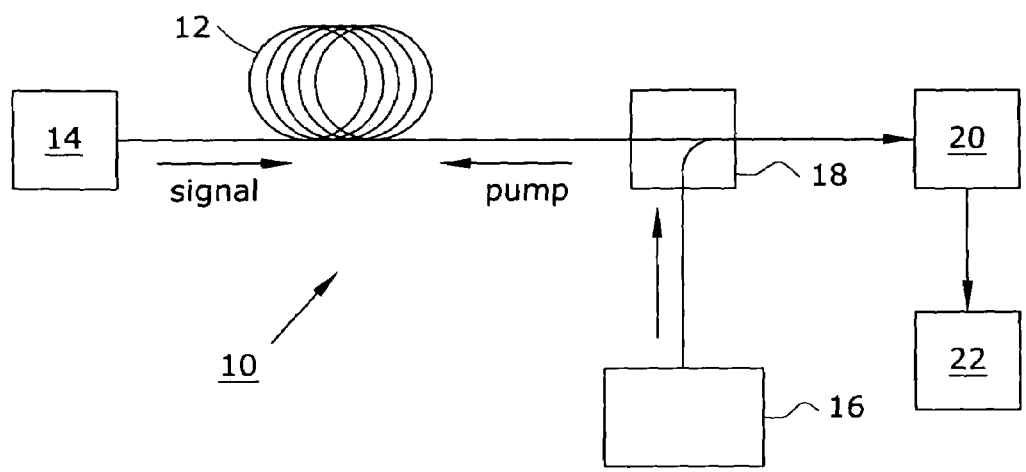
FIG. 1 contains a simplified drawing of an optical communication system capable of supporting Raman amplification in the S-band transmission regime in accordance with the present invention.

An optical fiber communication system 10 suitable for using the transmission fiber 12 of the present invention is illustrated in FIG. 1. In the particular arrangement of FIG. 1, transmission fiber 12 is formed as a distributed amplifier, dedicated to providing both transmission and amplification of an applied optical information signal I from a signal source, such as an optical transmitter 14. The length of transmission fiber 12 is typically at least 500 m, so as to allow for the optical interactions that produce Raman amplification to occur. In the particular arrangement of communication system 10, the amplifier is counter-pumped, with a Raman source 16 coupled into the core of transmission fiber 12 through a coupler 18, as shown. A dispersion compensation module 20, as discussed below, is disposed in the signal path between the output of transmission fiber 12 and an optical receiver 22. It is to be understood that this particular embodiment is exemplary only, and an arrangement using both a co-pumped Raman source (or sources) and a plurality of separate counter-pumped Raman sources may be used, particularly in dense WDM (DWDM) systems. Raman amplification may also be used in conjunction with erbium-doped fiber amplifiers (EDFAs) for optimum performance in certain applications. As described in general above and as will be discussed in detail below, the "water peak" comprises at least five sub-peaks, where the actual shape of the curve depends on the method of manufacture as well as how much hydroxyl is in the pure silica regions compared to the doped silica regions. As a results, the center of the water peak is cited in the fiber literature at various wavelengths ranging between 1380 and 1390 nm. For the purposes of the present discussion, a value of 1385 will be used as a definition of the "center" for the water peak in general. It is to be understood, however, that the teachings of the present invention are generally applicable to the above-mentioned complete range of 1380–1390 nm.

It has been noted that the particular dispersion vs. wavelength curve of an optical fiber design determines whether or not Raman amplification is readily supported over a desired band, as well as how precisely chromatic dispersion can be compensated over a wide wavelength band. FIG. 2 contains a graph of dispersion vs. wavelength for two different prior art fiber designs, as well as two fibers formed in accordance with the present invention. In particular, curves A and B illustrate the characteristics of two conventional prior art fibers, the TrueWave® REACH fiber (curve A) and the TrueWave® Reduced Sloped (RS) fiber (curve B). As shown, both of these fibers exhibit a negative dispersion value in the region required to generate a pump signal for S-band amplification. As shown, fiber A is impaired for Raman pumping for signal amplification near 1385 nm in the lower S-band by the presence of the ZDW near 1385 nm, and fiber B is impaired for both Raman pumping of C-band signals as well as signal propagation in the lower S-band by the presence of ZDW near 1460 nm. Therefore, neither fiber A nor fiber B fully qualifies as an SCL band fiber.

In order to suppress pump-pump FWM, the absolute value of dispersion should be approximately greater than 1 ps/nm-km; a similar condition is widely accepted as necessary to avoid signal-signal FWM in DWDM. In order to avoid pump-signal FWM, it is known that the ZDW should not be located approximately equally spaced between the pumps and the signals. Together, these conditions imply that the ideal ZDW for an SCL band fiber will be located either shorter than the shortest pump wavelength or longer than the longest signal wavelength. Therefore, for an SCL fiber, the ZDW should be less than about 1360 nm or greater than 1620 nm. It is possible to design a Raman system around a poorly-placed ZDW, but at the cost of complexity or expense in the system design, or sub-optimal gain flattening.

Fibers formed in accordance with the present invention, defined by curves C and D in FIG. 2, exhibit both of these requirements: a dispersion of greater than +1 ps/nm-km at 1385 nm, and a ZDW of approximately 1350 nm. As shown, the dispersion value for fibers C and D is greater than 1 at 1375 nm, while less than 10 ps/nm-km for wavelengths greater than 1565 nm.

Such a fiber formed in accordance with the present invention, in conjunction with appropriate dispersion compensation modules, will enable and support 40 Gb/s transmission and/or ultra-long haul transmission with Raman or hybrid Raman/EDFA amplification. In developing an appropriate dispersion compensation module, a relevant and useful parameter is the ratio of the dispersion slope (measured in ps/nm$^2$-km) to the dispersion at the central wavelength of the signal band (hereinafter referred to as the "relative dispersion slope" or RDS). If the RDS of the transmission fiber is equal to the RDS of a negative dispersion compensating fiber (as found in a compensation module), then precise cancellation of dispersion can be achieved over a wide range (e.g., ±15 to 20 nm). It has also been found that the match between a transmission fiber and dispersion compensating fiber with lower RDS will be generally superior to a combination of a transmission fiber and dispersion compensating fiber with higher RDS. A fiber formed in accordance with the present invention will have an RDS lower than 0.004/nm. Dispersion compensation modules formed to match standard matched clad fiber, or slight modifications thereof, have an RDS in the range 0.0023/nm to 0.0036/nm and will thus yield very low residual dispersion, suitable for 10 and 40 Gb/s long haul transmission when paired with a fiber formed according to the present invention.

FIG. 3 shows fiber loss curves for a non-zero dispersion fiber (NZDF) with varying degrees of water peak at 1385 nm, superimposing the location of the Raman pumps for first-order Raman pumping in the S-band and second-order Raman pumping in the extended L-band and upper C-band. Non-zero dispersion fibers, such as proposed here, have a higher GeO$_2$ content in the core than matched clad fibers, as well as a juxtaposition of multiple layers of doped materials thereby presenting more opportunities for stress and irregularities at the interfaces. These have the impact of raising the background loss (generally termed Rayleigh scattering), which varies as $\lambda^{-4}$. For this reason, NZDF fibers typically have higher background loss in the water peak region than matched clad fibers. An asymmetric Lorentzian curve is used to model in the water peak in FIG. 3, where the curve is actually a composite of multiple sub-peaks. Water peaks (at 1385 nm) of height 0.3, 0.35, 0.4, 0.35 and 0.5 dB/km are shown in FIG. 3. Associated losses at neighboring wavelengths relevant to the subsequent discussion are shown below in Table I. The lowest curve represents an OH loss approximately 10 mdB/km above the Rayleigh scattering baseline and can be considered as a nominal "zero water peak" NZDF silica fiber, whose core index is in the range of 0.4 to 0.5% Δ. Individual fibers exhibiting a lower Rayleigh coefficient may have water peak loses as low as 0.29 dB/km at 1385 nm.

TABLE I

| Attenuation in Water Peak Region | | | | |
|---|---|---|---|---|
| 1365 nm | 1375 nm | 1385 nm | 1395 nm | 1475 nm |
| 0.297 | 0.298 | 0.30 | 0.288 | 0.224 |
| 0.303 | 0.325 | 0.35 | 0.325 | 0.226 |
| 0.310 | 0.358 | 0.40 | 0.363 | 0.227 |
| 0.316 | 0.387 | 0.45 | 0.398 | 0.229 |
| 0.322 | 0.420 | 0.50 | 0.437 | 0.231 |
| 0.347 | 0.544 | 0.70 | 0.585 | 0.238 |

The deleterious effects of water peak attenuation on S-band amplification can be shown by considering two exemplary cases, as shown in FIG. 4, which illustrates first- and second-order Raman pumping configurations in which a Raman pump must be placed in immediate proximity to the water peak. Case (a) illustrates a first-order, single pump, narrow-band pump scheme, while case (b) illustrates a first-order, dual pump scheme for flat gain over a broader wavelength gain region. Raman pumps for broad, flat gain are typically spaced 15 to 20 nm apart, necessitating that full use of the lower S band requires two Raman pumps straddling the water peak. Case (c) is a second-order pumped Raman architecture for transmission in the L-band. It is to be understood that water peak loss and its variability impact the consistency of Raman gain, the average pump power required to achieve target Raman gain, and the OSNR of the amplifier.

First, consider the Raman gain variability due to simple variability in the pump region attenuation from fiber to fiber within a manufacturing distribution. A typical span for terrestrial transmission is approximately 100 km, built up from concatenated cable segments approximately 4 to 5 km in length. Thus, 20 to 25 fibers with 20–25 different loss values may be sampled in any given span. This averaging helps reduce the impact of variability in typical fiber transmission properties such as dispersion, mode field, or loss. However, Raman gain is only significant over several times the effective length for nonlinear interactions, which decreases with increasing loss as $L_{eff}=[1-\exp(-\alpha_{pump} L_{span})]/\alpha_{pump}$. For pump region loss between 0.3 and 0.5 dB/km, the effective length varies between 15 km and 9 km, respectively. Thus, the distributed Raman amplifier effectively comprises only four to six separate fibers, with the result that the effect of loss variation on Raman gain variation is a significant problem for the system design engineer.

The Raman gain (which may also be referred to as the "on-off" gain), can be expressed as $G=\exp(C_R*P_{pump}*L_{eff})$ for the case of counter-pumping as shown in FIG. 1. For water peaks of 0.3, 0.4 and 0.5 dB/km, and a single 540 mW pump at 1395 nm (as shown in case (a) in FIG. 4), the values of Raman gain G at 1490 nm are 22.0, 17.4, and 14.5 dB, respectively. This is a range of 7.5 dB, which is over a factor of five times variation in Raman gain. Such gain variation cannot be tolerated in practice, and the pump powers in a Raman span would be adjusted upon installation to achieve an actual gain within the conventional system engineering rules. Holding the water peak loss at 1385 nm to less than 0.4 dB/km will reduce the cost penalty associated with loss variability in the Raman pumping region for S-band systems, which can be understood from the following description.

A single pump, narrow band configuration may require up to (or greater than) 500 mW pump power, which would most likely be supplied by a fiber laser source. However, it is more desirable to pump wider band Raman systems with low-noise laser diodes. Commercial low-noise laser diodes have output powers ranging from 200 to 350 mW, and are available in gradations of 50 to 80 mW of output power. A very broad band Raman system (e.g., converting the entire C and L bands) could require as many as five to six pumps, between 50 and 200 mW each. A moderate band system might comprise two to three pumps of 100 to 300 mW output power. In general, the shortest wavelength pump will require two to three times the power of the other system pumps. To reduce cost, the smallest laser diode capable of handling the range of output powers required to compensate for fiber loss variability expected in the field would be used. For a water peak between 0.3 and 0.4 dB/km, the loss at 1395 nm varies by 25%, requiring pump power to be adjustable by 25% to achieve a targeted Raman gain. For a 0.3 to 0.5 dB/km range in water peak, a margin of 50% pump power would be required at 1395 nm. While averaging over four to six fibers comprising the Raman effective length will aid in mitigating this problem, it is clear that a water peak upper limit of 0.4 dB/km (and perhaps even lower, such as 0.325 dB/km) will greatly increase the likelihood that the lowest power (and thus smallest footprint) laser diodes can be specified in a transmission system to reduce cost of Raman pumping.

To illustrate the impact of loss on amplifier performance, it is useful to consider the evolution of signal power in a Raman amplified span. The trade-off between OSNR, pump power and fiber loss can be understood by analyzing the curves for representative cases. FIG. 3 illustrates the spectral loss curve of an NZDF fiber and Raman pump placement relevant to S-band operation with first-order pumping and extended L-band operation with second-order pumping. These two schemes both require placing Raman pumps very close to the water peak. The impact of differing water peak loss on the evolution of signal power along a 100 km span is shown in FIG. 5 for the case of a single Raman pump at 1395 nm for signals in the S-band near 1490 nm (case (a) of FIG. 4). Counter-pumping is also considered, where the Raman power is injected backward from the end of a span, as shown in FIG. 1, resulting in gain in the latter half of the span. In both cases, the distributed Raman gain of the span is designed to be equal to the total span loss of 22 dB. This design requires 540 mW of pump power at 1395 nm for the case of 0.50 dB/km water peak, and 820 mW of pump power for the case of 0.30 dB/km water peak. Although the Raman gains are equal, the minimum signal powers along the span differ by 2.3 dB, being lower in the case of higher pump attenuation. In the lower loss case, the Raman gain is often said to "penetrate further into the span", as shown by the fact that the signal minimum power occurs about 6 km earlier in the span than for the higher loss case.

These visual observations are directly related to the achieved OSNR. It has been shown that the difference in minimum signal power along the span in decibels (dB) is approximately equal to the difference in OSNR in dB. A non-rigorous explanation for the correlation between minimum signal power and OSNR can be found in the intuitive idea that more noise is generated while restoring a weaker signal to its original power level than in restoring a stronger signal. As noted, the minimum signal power for the lower pump loss Raman case is 2.3 dB greater (i.e., more desirable) than for the higher pump loss case. However, even the less favorable Raman case has 5.3 dB greater minimum signal power along the span than for no Raman amplification. In lumped amplification (as with an EDFA), the signal power drops by the total span loss (22 dB for the exemplary case shown in FIG. 5, curve labeled 'No Raman gain') and then undergoes rapid amplification over a short section of high gain erbium-doped fiber. In a Raman amplifier the gain per unit length is lower than for an EDFA but is distributed over a significant percentage of the transmission distance, so that the optical power in the fiber reaches a minimum mid-span and then begins to increase.

The distance over which significant Raman amplification occurs is quantified by the effective length parameter, defined as $L_{eff}=(1-\exp(-\alpha_{pump}*L_{span}))/\alpha_{pump}$. A longer effective length means a greater degree of distributed amplification and results in a higher minimum signal power and a greater performance benefit through improved OSNR. A detailed understanding of the correlation between minimum signal power and improved OSNR requires the solution of differential equations describing the build-up of amplified spontaneous emission (ASE) in the amplifier. However, the physics can be summarized as follows: ASE refers to noise that is generated in the presence of gain, which is added to the signal being amplified. Most ASE power at the output of an amplifier comes from the ASE which is generated near the input of gain medium and then amplified exponentially along the remainder of the gain medium. In a lumped amplifier such as an EDFA, ASE is added to the signal over a very short distance (i.e., tens of meters) in a high gain per unit length amplifier fiber and the ASE itself experiences practically no fiber loss. In the case of a distributed amplifier, ASE builds up more slowly in the presence of a lower gain per unit length so that it does experience the same attenuation as the signal itself. Therefore, ASE generated early in the span (in the range of 70 to 75 km for the cases of FIG. 5) will suffer fiber loss over 20 to 25 km in addition to being amplified by Raman gain. This reduces the exponential gain experienced by the ASE generated early in the amplifier, resulting in lower total ASE power and better OSNR.

Thus, it can be seen that the minimum signal power in the span, the distance into the span at which the minimum occurs, the total ASE generated, and the resultant OSNR are all related. Optimum performance is obtained for the longest effective length, which requires minimum fiber loss at the Raman pump wavelengths. While the reduction in net Raman gain due to stronger pump attenuation can be countered by raising pump power, the deleterious impact of high attenuation near the water peak on OSNR cannot be mitigated. The OSNR for the case $\alpha_{pump}=0.50$ dB/km will be approximately 2.3 dB worse than for the case $\alpha_{pump}=0.30$ dB/km, in spite of the fact that Raman gains are adjusted to be equal. Furthermore, greater cost may be incurred in Raman pumping, and higher heat dissipation load on the associated packaging will invariably result.

The above-described case (a) of FIG. 2 considers a single Raman pump. For wideband systems, it is typical to use multiple Raman pumps, spaced 15 to 20 nm apart, with exact wavelengths chosen to achieve flat gain profile. To operate in the lower S-band (1460 to 1500 nm), it is not possible to avoid placing Raman pumps very close to the water peak. Case (b) as shown in FIG. 4 illustrates that Raman pumps placed at 1375 and 1395 nm will experience approximately equal attenuation (see Table I), at the levels used in the calculation of FIG. 5. The deleterious impact on OSNR calculated above will be mitigated somewhat by the fact that the Raman gain in the region of 1490 nm will actually contain contributions from both Raman pumps near the water peak (experiencing higher loss with less penetration into the span), as well as from Raman pumps away from the water peak (penetrating farther into the span). However, the additional problem of Raman gain tilt, whereby a Raman pump at a lower wavelength loses energy to a Raman pump at a higher wavelength, occurs in broadband Raman schemes. This further penalizes performance in the lower channels and adds emphasis to the need to minimize pump loss near the water peak for a variety of Raman pumping cases.

An additional example can be found in the case of second-order Raman pumping for amplification in the L-band (case (c) of FIG. 4). The second-order pumping paradigm uses an additional, lower wavelength Raman pump to amplify the Raman pump, extending the first-order scheme as diagramed in FIG. 1. The basic advantage is that Raman gain penetrates farther into the span, leading to further benefit in OSNR. However, higher Raman pump powers are required. In the exemplary calculation, a second-order Raman pump is placed at 1375 nm, the first-order pump at 1475 nm, for amplifying signals in the range of 1580 nm. Such a single second-order pump, plus the single first-order pump configuration has been used in the literature to achieve the same gain flatness over a bandwidth of 30 nm as achieved by three first-order pumps. The total pump powers (first-order and second-order) required to achieve 15 dB of Raman gain are 703, 771, 841 and 973 mW for water peaks of, respectively, 0.3, 0.4, 0.5 and 0.7 dB/km. The power evolution curves are shown in FIG. 6.

Several important points are to be noted. First, the minimum power in the span varies by over 1 dB, corresponding to approximately 1 dB deterioration of OSNR from the case of 0.3 dB/km to 0.7 dB/km water peak height. This degradation of Raman gain is less severe than the first-order case. However, the total power required to achieve the 15 dB of targeted gain becomes very significant for losses above the 0.30 dB/km lower limit on water peak. This is important since a high power damage phenomenon commonly known as the "fiber fuse" can occur in optical fibers that are handled or perturbed while carrying power levels of approximately one watt. It is therefore desirable to maintain Raman pumping levels as low as possible to enhance reliability. Although the fiber fuse occurs for a wide range of optical power levels, the value of constraining water peak to be less than 0.4 dB/km can readily be appreciated, since that limits the required total Raman pump power (in this exemplary case, to 75% of the approximately one watt value associated with initiation of the fiber fuse). The cost of the higher power Raman pump and the associated additional heat dissipation loads are, of course, undesirable in any case.

From the examples of first-order Raman pumping in the lower S-band or second-order Raman pumping in the L-band, it is clear that the water peak must be minimized in order for optimum application of Raman amplification. The attenuation at 1385 nm should be as low and as stable as possible from fiber to fiber in order to enable system engineers to design to known conditions. While it is obvious that lower is better, a practical balance must be maintained between what can be commercially achieved and what is ideal. It is well accepted that the VAD method can readily produce commercial matched clad fibers with water peaks below 0.31 dB/km, although there are special challenges to fabricating low slope NZD fibers with this method. It is non-trivial to match this limit with commercial MCVD fibers for a variety of reasons. However, the exemplary calculations above show that a water peak limit of 0.4 dB/km restricts degradation in OSNR due to pump attenuation to approximately 1 dB for first-order Raman pumping (see FIG. 5), while holding the total Raman pump power required for second-order Raman amplification to 75% of the one watt level where high power nuisance effects are known to occur. A 0.4 dB/km limit is also sufficient to limit the design margin in Raman pump power to less than 25% so as to reduce the costs associated with over-specifying laser diodes.

Therefore, an optical fiber for SCL band operation is defined in accordance with the present invention as a fiber which has both the appropriate dispersion curve to avoid FWM for signals and Raman pumps, and which has a water peak loss less then 0.4 dB/km (and preferably lower) to prevent OSNR degradation, high pump power costs and high power damage phenomena.

FIGS. 7–9 illustrate the refractive index profiles of three exemplary fibers exhibiting the desired characteristics of the present invention. The y-axes show units of relative delta, which is defined as $(n(r)-n_{clad})/n_{clad}$. The standard radius of an optical fiber is 62.5 microns. In particular, fibers that exhibit an acceptable bending loss will have an effective area in the range of 50–65 $\mu m^2$. The fiber shown in FIG. 7 has an effective area of 55 square microns, dispersion of 9 ps/nm/km, slope of 0.033 ps/nm²/km, and an RDS of 0.0037/nm, all at a wavelength of 1550 nm. The fiber of FIG. 8 has an effective area of 55 square microns, dispersion of 8 ps/nm/km, a slope of 0.027 ps/nm$^2$ km, and an RDS of 0.0033/nm, again at a wavelength of 1550 nm. The fiber of FIG. 9 has an effective area of 60 square microns, dispersion of 9 ps/nm/km, a slope of 0.035 ps/nm$^2$/km and an RDS of 0.0038/nm, all at 1550 nm. The fiber if FIG. 7 has a fiber cutoff less than 1275 nm, implying a cable cutoff that is 50 to 75 nm lower than still. The fiber of FIG. 8 has a cutoff less than 1300 nm, also implying a cable cutoff less than 50 to 75 nm. The fiber of FIG. 9 has both fiber and cable cutoffs below 1200 nm. Thus, all are compatible with 1310 nm transmission, including cutoff and dispersion requirements. In all cases, the properties of the optical fibers produced using these performs fall within the following prescription:

water peak loss (WPL) at 1385 nm less than 0.4 dB/km in all cases, and in particular maintained less than or equal to 0.325 dB/km by fabricating the core region using the VAD or outside vapor deposition (OVD) processes;

zero dispersion wavelength (ZDW) less than or equal to 1355 nm (only one ZDW across entire transmission band from 1310 to 1625 nm); and chromatic dispersion (D) greater than 1 ps/nm-km at 1375 nm and less than 10 ps/nm-km at 1565 nm.

The illustrated optical fiber profiles generally comprise five separate regions. Referring to FIG. 7, the regions are defined as central core region 30, trench region 32, ring region 34, depressed cladding region 36 and outer cladding region 38. The fiber of FIG. 8 illustrates a similar profile. Central core region 30, which extends outward from the center to a radius defined as "a", exhibits a raised index of refraction with respect to the remaining regions of the fiber. The core region 30 and ring region 34 will typically comprise germanium-doped silica, while trench region 32 and depressed cladding region 36 will typically comprise fluorine-doped silica. It is to be understood that trace amounts of other dopants (such as, among others, Ge, F, Ti, Al or P) may be incorporated into one or more of the regions to attain certain advantages in processing or properties. Synthetic tubing used as substrates or overcladding tubes may be fluorine doped to contributed to forming depressed cladding region 36. Tubing may also contain Cl, consistent with processing methods used in production, where the Cl may induce small but incidental variations in index. Fabrication of regions 30, 32, 34 and 36 is generally completed as an intermediate step in perform manufacture; formation of region 38 is the actual overcladding step and may be accomplished by a rod-in-tube or soot deposition method.

In accordance with one embodiment of the present invention, the desired attenuation at the water peak of 1385 nm (i.e., a low water peak on the order of 0.31 dB/km) is achieved by forming core region 30 and trench region 32 using a vapor-axial deposition (VAD) process. See, for example, U.S. Pat. No. 6,131,415 (herein incorporated by reference) for a complete description of using a VAD process to form an optical fiber exhibiting low water peak loss at 1385 nm. All else being equal, VAD (or OVD) glass has the inherent advantage over MCVD glass of having an explicit dehydration step between soot deposition and sintering. Although the deposited soot is initially very "wet" due to the oxy-hydrogen flame in VAD or OVD, subsequent dehydration in $Cl_2$ renders the core material dry enough to exhibit a water peak consistently only 0.005 to 0.010 dB/km above the Rayleigh scattering background, corresponding to OH concentration of a fraction of a ppb. No hydrogen source is purposely present during the deposition of MCVD soot. However, trace hydrogen impurities that are present are immediately sintered into the glass structure with no additional dehydration step. The MCVD substrate tube—if less dry than the deposited material—may also contribute OH concentration which significantly overlaps the optical power distribution. As a result, there is a net advantage in using VAD or OVD glass to form regions 30 and 34, where approximately 98–99% of the optical power resides. However, the VAD/OVD process is not adept at forming an additional layer of up-doped (e.g., germanium-doped) material (such as ring region 34) outside the trench region 32 without resorting to schemes that compromise the advantage of ultra-dryness as described above.

Figure 10:
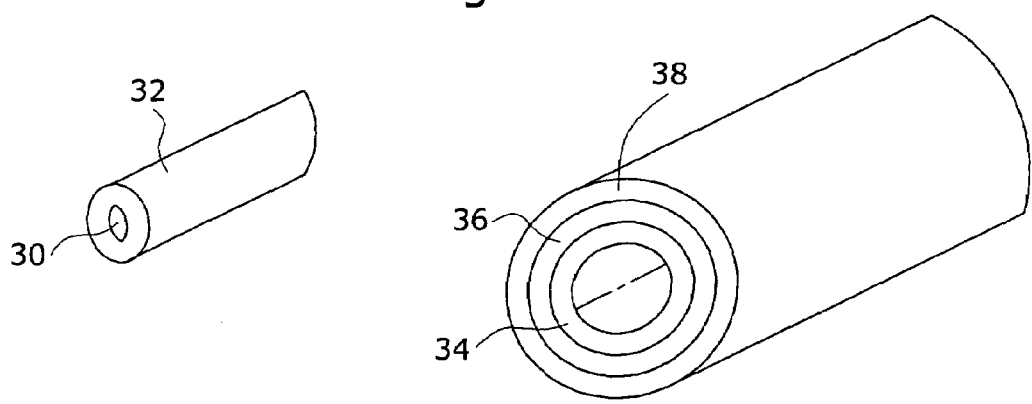
FIG. 10 depicts the two separate perform sections that may be used to form the optical fiber of the present invention.

Therefore, ring region 34 and depressed cladding region 36 are preferably formed separately, using a conventional MCVD process, and outer cladding region 38 may be supplied via a tube overcladding process. FIG. 10 illustrates the two separate perform sections, a first perform section 40 comprising core region 30 and trench region 32, and a second perform section 42 comprising ring region 34, depressed cladding region 36, and outer cladding 38. The interface between the two separate performs sections 40 and 42 is formed in a chlorine (or fluorine) atmosphere (or a mixture of chlorine and fluorine, or some other appropriate atmosphere), resulting in the formation of an ultra-dry interface to avoid adding OH attenuation at 1383 nm from the step of mating the VAD inner core to the MCVD outer core. A desirable variation on this method is to use high purity, doped, synthetic silica tubes to form regions 34 and 36, and form interfaces between regions 34 and 36 in a chlorine (or other ultra-dry) atmosphere. It is to be understood that a chlorine or fluorine atmosphere is supplied at high temperature by thermal breakdown of various chemicals containing Cl or F atoms, including $Cl_2$, $CF_4$, $C_2F_6$, $CCl_4$, $SiF_4$ or $SF_6$, which may be used alone or in concert.

It is to be understood that the above-described process is exemplary only and various other processes exist that are capable of forming a fiber with the desired low water peak loss characteristic. In particular, slightly higher median water peaks in the range of 0.325–0.34 dB/km (low enough to gain the advantages described above) can be achieved in standard MCVD core fabrication if the MCVD process is practiced with diligent attention to some or all of the following issues: use of ultra low water synthetic silica substrate tubes, forming a large deposited outer cladding, use of feedstock gases with ultra-low H impurities, high integrity of the chemical delivery systems, highly effective seals and rotary couplings between the MCVD lathe and substrate tube, and use of a furnace heat source for deposition and/or collapse. Treatment of fibers with deuterium, either in perform or fiber stage, prevents subsequent elevation of 1385 nm loss by several hundredths, due to hydrogen exposure during cabling or other environmental sources. Such a procedure would likely be necessary to realize the full potential of the present invention, regardless of the particular fabrication process. As mentioned above, an OVD process may be used in lieu of the VAD process in most circumstances.

In summary, the present invention provides a non-zero dispersion shifted fiber that combines a low water peak attenuation value with a properly located zero dispersion wavelength to provide for S-band amplification without adversely affecting the transmission or amplification of signals operating in either the C-band or L-band regions. The very low water peak attenuation is considered necessary as an adjunct to having the zero dispersion wavelength in the proper location since Raman pumps useful for S-band signals will have a pump source "sitting on" the water peak wavelength of 1385 nm. Unless the water peak value is tightly controlled, as is accomplished in accordance with the present invention, Raman amplification for S-band signals will be both inefficient and variable, and therefore suffer degradation in system performance.

What is claimed is:

1. An optical WDM transmission system using Raman amplification, said system comprising:

a length of optical fiber including a core region;

an optical transmitter for introducing a lightwave information signal into the optical fiber, the lightwave information signal including separate signal channels operating at at least three separate wavelengths, wavelength division multiplexed (WMD) to form the lightwave information signal;

an optical pump source for introducing optical energy into the core region of said optical fiber, whereby the optical pump energy interacts with the lightwave information signal to produce Raman amplification of said lightwave information signal, wherein the invention is characterized in that the optical fiber has the following properties:

low water peak at 1385 nm less than 0.4 dB/km;

zero dispersion wavelength (ZDW) less than or equal to 1355 nm, with only one ZDW across the entire transmission band from 1310 to 1625 nm;

chromatic dispersion (D) greater than 1 ps/nm-km at 1375 nm and between about 7.5 and about 9.5 ps/nm-km 1550 nm; and an effective area in the range of 50 to 65 µm² at 1550 nm.

2. The system as defined in claim 1 wherein the optical fiber comprises an inner, high index core region and a surrounding, lower index trench region, a ring region surrounding said lower index trench region, a depressed cladding region and an outer cladding region formed to surround said ring region.

3. The system as defined in claim 1 wherein the optical fiber has a low water peak loss at 1385 nm of less than 0.35 dB/km.

4. The system as defined in claim 3 wherein the optical fiber comprises an inner, high index core region and a surrounding, lower index trench region, a ring region surrounding said lower index trench region, a depressed cladding region and an outer cladding region formed to surround said ring region.

5. An optical fiber characterized by:

low water peak at 1385 nm less than 0.4 dB/km;

zero dispersion wavelength (ZDW) less than or equal to 1355 nm, with only one ZDW across the entire transmission band from 1310 to 1625 nm;

chromatic dispersion (D) greater than 1 ps/nm-km at 1375 nm and between about 7.5 and about 9.5 ps/nm-km at 1550 nm; and an effective area in the range of 50 to 65 µm² at 1550 nm.

6. The optical fiber as defined by claim 5 wherein the fiber comprises an inner, high index core region and a surrounding, lower index trench region, a ring region surrounding said lower index trench region, a depressed cladding region and an outer cladding region formed to surround said ring region.

7. The optical fiber as defined by claim 5 with a low water peak at 1385 n less than 0.35 dB/km.

8. The optical fiber as defined by claim 7 wherein the fiber comprises an inner, high index core region and a surrounding, lower index trench region, a ring region surrounding said lower index trench region, a depressed cladding region and an outer cladding region formed to surround said ring region.

* * * * *